(No Model.)
W. D. TURNER.
THILL COUPLING.
No. 523,494.  Patented July 24, 1894.
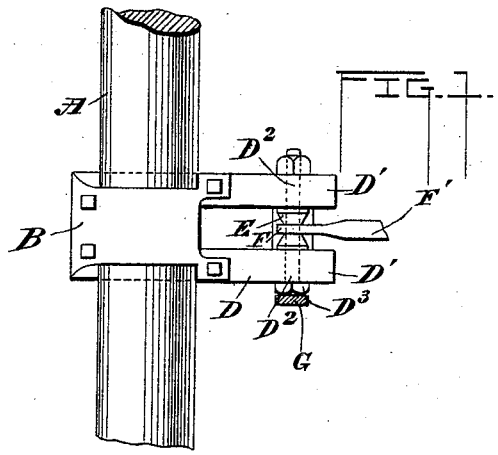
FIG. 1.
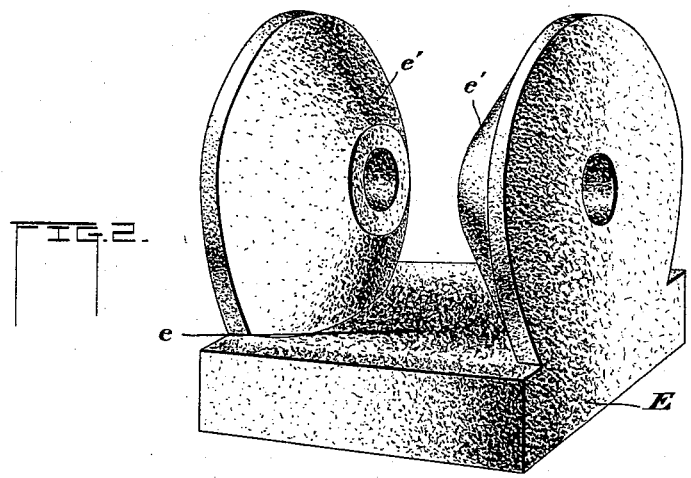
FIG. 2.
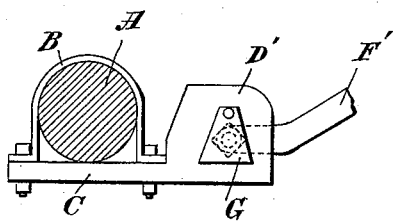
FIG. 3.
Witnesses
Frank Blair Rives.
J. N. Green.
Inventor
William D. Turner,
by Watton & Co.
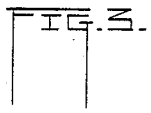
Attorneys.
THE NORRIS PETERS CO., PHOTO-LITHO., WASHINGTON, D. C.

UNITED STATES PATENT OFFICE.

WILLIAM D. TURNER, OF FERGUSSON'S WHARF, VIRGINIA.

THILL-COUPLING.

SPECIFICATION forming part of Letters Patent No. 523,494, dated July 24, 1894.

Application filed April 6, 1894. Serial No. 506,594. (No model.)

*To all whom it may concern:*

Be it known that I, WILLIAM D. TURNER, a citizen of the United States of America, residing at Fergusson's Wharf, in the county of Isle of Wight and State of Virginia, have invented certain new and useful Improvements in Thill-Couplings, of which the following is a specification.

My invention relates to improvements in anti-rattling thill-couplings for vehicles.

An object of my invention is to provide a rectangular shaped rubber bushing, the front part of which is partially cut away to leave two opposite inwardly projecting cones centrally apertured and integral with the bushing which are sprung apart for the insertion of an eye on the rear end of a thill or shaft when the shaft and shackle on the axle of a vehicle are coupled together.

Further objects of my invention are to provide a simple, elastic, and integral rubber bushing which may be cheaply manufactured, readily used, and to provide other minor details in construction which will hereinafter be more fully pointed out in the specification and claim.

In the accompanying drawings, Figure 1, is a plan view of an axle, a clip and shackle thereon, a shaft and the anti-rattling device coupled together, certain parts being broken away for better illustration. Fig. 2, is a perspective view of the bushing. Fig. 3, is a view in side elevation of the coupling.

In the drawings, A, refers to an axle of a vehicle.

B, is a clip of well known form which embraces the axle and is bolted to a tie plate C, underneath the axle, which has two enlarged portions projecting forward forming two side jaws D', of a shackle D, which have holes D², for the insertion of a coupling bolt D³, the latter having a threaded end on which is screwed a nut to couple the shaft or thill, bushing E, and shackle together, as will hereinafter appear.

G, is a V-shaped latch pivoted at its apex to the outside of one of the jaws of the shackle above the bolt hole D², so that it will in its normal position contact with the head of the bolt when the latter is in place and prevent the same from working out of the shackle in case the nut on its opposite end should become unscrewed, see Fig. 3.

E, is the bushing, made from a rectangular shaped block or cube of rubber by cutting away its front, upper and lower sides in part to leave two oppositely inwardly projecting cones e', and a cavity in rear of the same, as shown in Fig. 2. The apexes of these cones are near together, and an aperture passes through the bushing, the same passing vertically and centrally through the cones. This bushing E, is sprung over the eye F on the end of shaft F', the apexes of the cones engaging the sides of the eye F, so that the apertures in the bushing and in the eye form a continuous aperture. The eye F, of the shaft with the bushing E, thereon is next forced between the jaws D', of the shackle D, and the continuous aperture is brought in line with the apertures D² in the jaws of the shackle, latch G, is then raised and bolt D³, is forced through these apertures, a nut screwed on its opposite end,—the latch G, dropped in place over the head of the bolt, and the parts are securely coupled together.

The cut away portion e, of the bushing prevents friction by giving freedom for movement of the eye of the thill or shaft.

The bushing being made as a unit and the cones elastic, on account of their peculiar construction, will hold the parts in place without too great rigidity to cause breakage, and at the same time prevent contact of the eye and shackle to cause disagreeable rattling and noise.

Having thus described my invention, what I claim as new is—

An anti-rattling coupling comprising an axle, a clip and tie plate secured thereon, said tie plate having forwardly projecting jaws forming a shackle, a rectangular shaped bushing, partially cut away to form two opposite inwardly projecting cones, an aperture passing through the bushing, and the apexes of the cones, a recess in the bushing in rear of the cones, an eye on a shaft, a bolt passing through apertures in said jaws, through the aperture in the bushing and the eye on the shaft, a nut on the end of the bolt, and a latch pivoted to one of the jaws of the shackle to bear against the head of the bolt, substantially as described and set forth.

In testimony whereof I affix my signature in presence of two witnesses.

WILLIAM D. TURNER.

Witnesses:
T. I. WELLER,
JO. LANE STERN.